(12) United States Patent
Green et al.

(10) Patent No.: US 11,569,724 B2
(45) Date of Patent: Jan. 31, 2023

(54) FARADAY BASED PALLET GENERATOR FOR DEVICE CHARGING

(71) Applicant: INTERNATIONAL BUSINESS MACHINES CORPORATION, Armonk, NY (US)

(72) Inventors: William J Green, Cary, NC (US); Cedric D. Cook, Richmond, TX (US); Myneeka Holloway, Austin, TX (US); Jimmie Lamar Powell, Jr., Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 16/939,417

(22) Filed: Jul. 27, 2020

(65) Prior Publication Data

US 2022/0029516 A1 Jan. 27, 2022

(51) Int. Cl.
*H02K 44/16* (2006.01)
*H01F 7/20* (2006.01)

(52) U.S. Cl.
CPC .............. *H02K 44/16* (2013.01); *H01F 7/202* (2013.01)

(58) Field of Classification Search
CPC ......... H02K 44/16; H02K 35/02; H01F 7/202
See application file for complete search history.

(56) References Cited

U.S. PATENT DOCUMENTS

| 6,737,789 B2 | 5/2004 | Radziemski |
|---|---|---|
| 7,038,585 B2 | 5/2006 | Hall |
| 7,847,421 B2 | 12/2010 | Gardner |
| 8,154,177 B1 | 4/2012 | Churchill |
| 8,729,747 B2 | 5/2014 | Arnold |

(Continued)

FOREIGN PATENT DOCUMENTS

| CN | 108233768 A | 6/2018 |
|---|---|---|
| EP | 25360201 B1 | 2/2016 |

(Continued)

OTHER PUBLICATIONS

O'Connor et al., "Power Management Circuit for Kinetic Energy Harvesting from Freight Railcars", IEEE, 2017, https://ieeexplore.ieee.org/search/searchresult.jsp?newsearch=true&queryText=power%20management%20circuit%20for%20kinetic%20energy%20harvesting%20from%20freight%20railcars, pp. 1-4.

(Continued)

*Primary Examiner* — Bernard Rojas
(74) *Attorney, Agent, or Firm* — Tihon Poltavets

(57) ABSTRACT

A faraday generator structure disposed between an upper platform and a lower platform, where the faraday generator structure includes a magnet, a coil structure, and a guide shaft. The magnet, of the faraday generator structure, coupled to the guide shaft configured to pass through an inner aperture area of the ring structure during a compression and rebound of a dampener positioned between the upper platform and the lower platform, where a voltage is produced as the magnet passes through the inner aperture area of the ring structure. The dampener, of the faraday generator structure, configured to compress under an additional load applied to an existing load on a top surface of the upper platform. The faraday generator structure configured to provide the voltage to an electrically coupled power storage unit.

17 Claims, 7 Drawing Sheets

(56) References Cited

U.S. PATENT DOCUMENTS

| | | |
|---|---|---|
| 10,033,304 B2 | 7/2018 | Feng |
| 10,044,018 B2 | 8/2018 | Soleski |
| 2003/0034697 A1* | 2/2003 | Goldner ................. F16F 15/03 |
| | | 310/15 |
| 2007/0114890 A1 | 5/2007 | Churchill |
| 2007/0284969 A1 | 12/2007 | Xu |
| 2019/0033172 A1 | 1/2019 | Montemurro |
| 2019/0190550 A1 | 6/2019 | Williams |
| 2020/0076288 A1* | 3/2020 | Nerubenko ........... F16F 7/1005 |
| 2021/0359584 A1* | 11/2021 | Lewis ..................... H02K 5/22 |

FOREIGN PATENT DOCUMENTS

| | | |
|---|---|---|
| GB | 2475497 A | 5/2011 |
| JP | 2002004620 A | 1/2002 |
| KR | 101064100 B1 | 9/2011 |

OTHER PUBLICATIONS

Shirvanimoghaddam et al., "Towards a Green and Self-Powered Internet of Things Using Piezoelectric Energy Harvesting", https://arxiv.org/pdf/1712.02277.pdf, 2019 IEEE., pp. 1-16.
IBM, List of IBM Patents or Patent Applications Treated as Related, Appendix P, dated Jul. 29, 2020, 2 pages.
Pending U.S. Appl. No. 16/939,436, filed Jul. 27, 2020, entitled: "Piezoelectric Based Pallet Generator for Device Charging", 26 pages.

\* cited by examiner

FARADAY BASED PALLET GENERATOR FOR DEVICE CHARGING

FIELD OF THE INVENTION

This disclosure relates generally to device charging, and in particular, to a faraday-based generator integrated into a pallet for device charging.

BACKGROUND OF THE INVENTION

Presently, various companies utilize a wide range of devices that require electricity, including Internet of Things (IoT) sensors with enabled Global Positioning System (GPS) to monitor a position and status of a shipment (e.g., server equipment) during transit between an origin location and a destination location. The status of the shipment is monitored by collecting various data during transit that includes shock, vibration, tilt, temperature, humidity, and light readings. For shipments with extensive transit times (e.g., ground shipments, weather related delays) the IoT sensors can experience a depletion of power reserves, thus resulting in missing data for the position and the status of the shipment.

SUMMARY

One aspect of an embodiment of the present invention discloses an apparatus for a faraday generator structure, the apparatus comprising the faraday generator structure disposed between an upper platform and a lower platform, wherein the faraday generator structure includes a magnet, a coil structure, and a guide shaft. The apparatus further comprising the magnet coupled to the guide shaft configured to pass through an inner aperture area of the ring structure during a compression and rebound of a dampener positioned between the upper platform and the lower platform, wherein a voltage is produced as the magnet passes through the inner aperture area of the ring structure. The apparatus further comprising the dampener configured to compress under an additional load applied to an existing load on a top surface of the upper platform. The apparatus further comprising the faraday generator structure configured to provide the voltage to an electrically coupled power storage unit.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
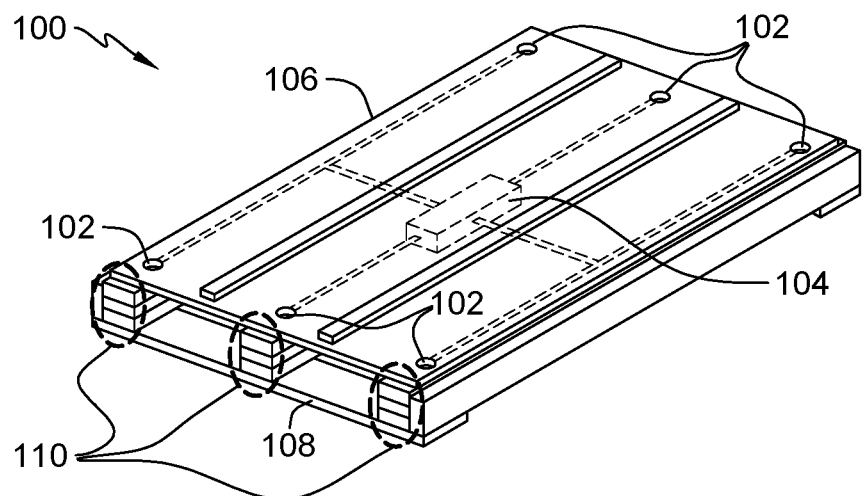
FIG. 1 depicts a pallet with multiple integrated faraday generator structures and electronic device, in accordance with an embodiment of the present invention.

Embodiments of the present invention provide a faraday generator structure integrated into a pallet, where the faraday generator structure is disposed between an upper platform and a lower platform of the pallet. The faraday generator structure utilizes additional forces (e.g., shock, vibration) applied to the upper platform which includes a previously applied load (i.e., shipment), to generate charge for one or more electronic devices associated with the pallet or the previously applied load. As the additional force is translated to the faraday generator structure, energy is harvested and utilized to generate electrical power to charge a battery or capacitor for providing charge to the one or more electronic devices.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure or first member, is present on a second element, such as a second structure or second member, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

FIG. 1 depicts a pallet with multiple integrated faraday generator structures and electronic device, in accordance with an embodiment of the present invention. Pallet 100 includes multiple faraday generator structures 102 electrically coupled to electronic device 104, where each faraday generator structure 102 is positioned at various points of pallet 100. Electronic device 104 is electrically coupled to the multiple faraday generator structures 102 utilizing one or more of cables, electrical contact pads, inductive charging, or other mediums for transferring electrical current. Pallet 100 includes upper platform 106 and lower platform 108, where a lower surface of upper platform 106 is disposed on a top surface of supporting structures 110 and a lower surface of supporting structures 110 are disposed on a top surface of lower platform 108. The combination of upper platform 106, lower platform 108, and supporting structures 110 for pallet 100. Supporting structure 110 can be a cushioning dampening material (e.g., foam, deformable plastic, corrugated cardboard), a solid material (e.g., wood, rigid plastic), or a combination of a solid material and a dampening material.

In this embodiment, electronic device 104 is integrated into pallet 100, where electronic device 104 can be positioned at any location on pallet 100 such that electronic device 104 does not interfere with a load placed on a top surface of upper platform 106. Electronic device 104 is positioned in a cavity in a center supporting structure 110, where a single fork of a forklift or pallet jack is placeable between the center supporting structure 110. In one example, electronic device 104 is positioned between upper platform 106 and lower platform 108 in a cavity of supporting structures 110. In another embodiment, electronic device 104 is positioned on a perimeter edge of upper platform 106. Electronic device 104 represents any device (e.g., IoT device) with one or more integrated sensors capable of capturing data readings that include position, shock, vibration, tilt, temperature, humidity, light, and any other pertinent data for monitoring a shipment during transit between an origin location and a destination location. In this embodiment, each faraday generator structure 102 includes a coupled power storage unit (e.g., battery, capacitor, supercapacitor), where each faraday generator structure 102 is capable of supplying power to electronic device 104. Electronic device 104 includes an integrated power storage for primary power, where secondary power (e.g., backup power) for electronic device 104 is sourced from the power storage units coupled to faraday generator structures 102. Alternatively, each faraday generator structure 102 directly provides charge to an integrated power storage of electronic device 104.

Figure 2:
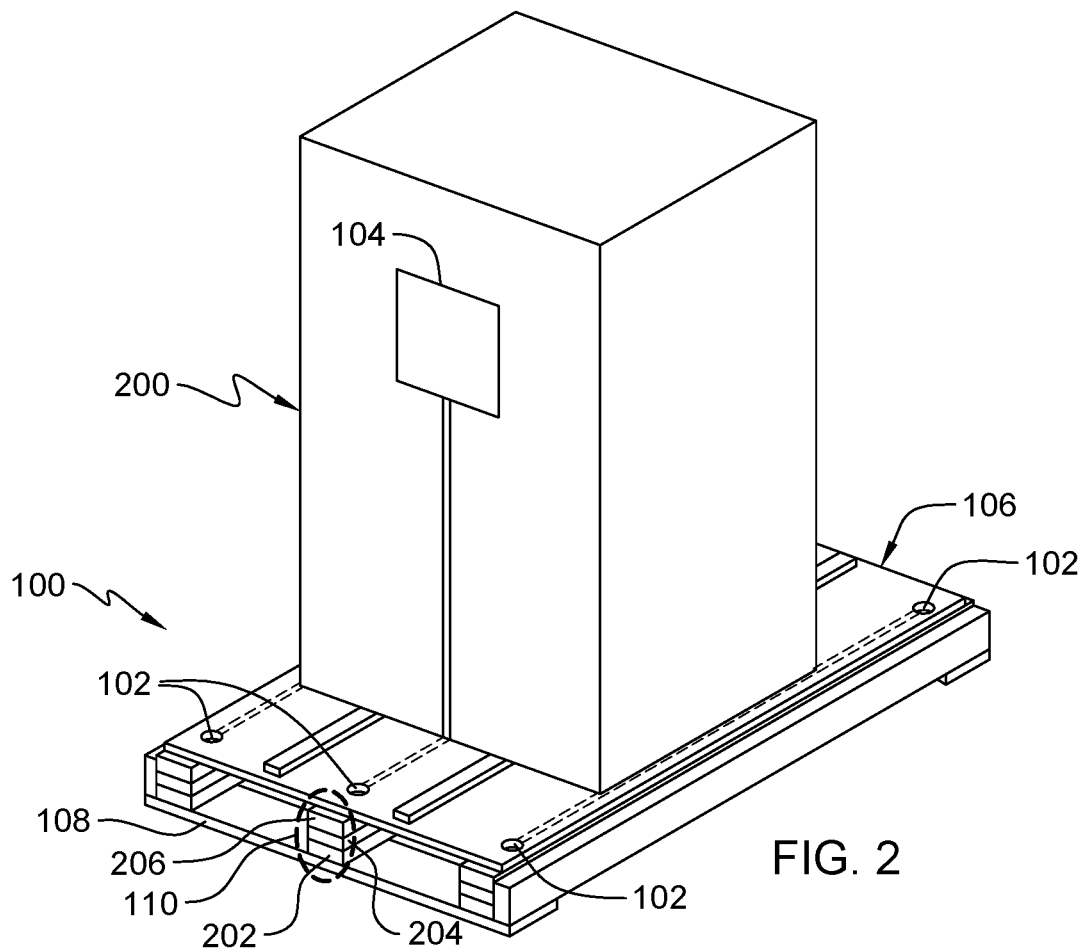
FIG. 2 depicts a pallet with multiple integrated faraday generator structures electrically coupled to an electronic device mounted to a shipment, in accordance with an embodiment of the present invention.

FIG. 2 depicts a pallet with multiple integrated faraday generator structures electrically coupled to an electronic device mounted to a shipment, in accordance with an embodiment of the present invention. In this embodiment, electronic device 104 is attachable to shipment 200 (e.g., server equipment), where shipment 200 is disposed on upper platform 106 of pallet 100 and electronic device is electrically coupled to the multiple faraday generator structures 102. A type and mounting location of electronic device 104 affixed to shipment 200 allows for shipment specific customization, where any type of electronic device 104 is capable of being electrically coupled to the multiple faraday generator structures 102 for supplement power and charging capabilities. In other embodiment, the multiple faraday generator structures 102 are electrically coupled to electronic device 104 and one or more other electrical devices (e.g., auxiliary fan, dehumidifier) to provide supplement power and charging capabilities.

As previously discussed, supporting structure 110 can be a cushioning dampening material (e.g., foam, deformable plastic, corrugated cardboard), a solid material (e.g., wood, rigid plastic), or a combination of one or more solid materials and one or more dampening materials. In this embodiment, each supporting structure 110 includes dampening material 204 positioned between first solid material 202 and second solid material 206. First solid material 202 is disposed on a top surface of lower platform 108, dampening material 204 is disposed on a top surface of first solid material 202, second solid material 206 is disposed on a top surface of dampening material 204, and a bottom surface of upper platform 106 is disposed on a top surface of second solid material 206. A compression and rebound of damping material 204 provides a vertical movement (i.e., y-axis) of upper platform 106 with respect to lower platform 108, where the vertical movement allows for each of the multiple faraday generator structures 102 to generate power. In some embodiments, a deflection and rebound of upper platform 106 also provides a vertical movement with respect to lower platform 108, where one or more piezoelectric pads of each faraday generator structure 102 generates power.

Figure 3:
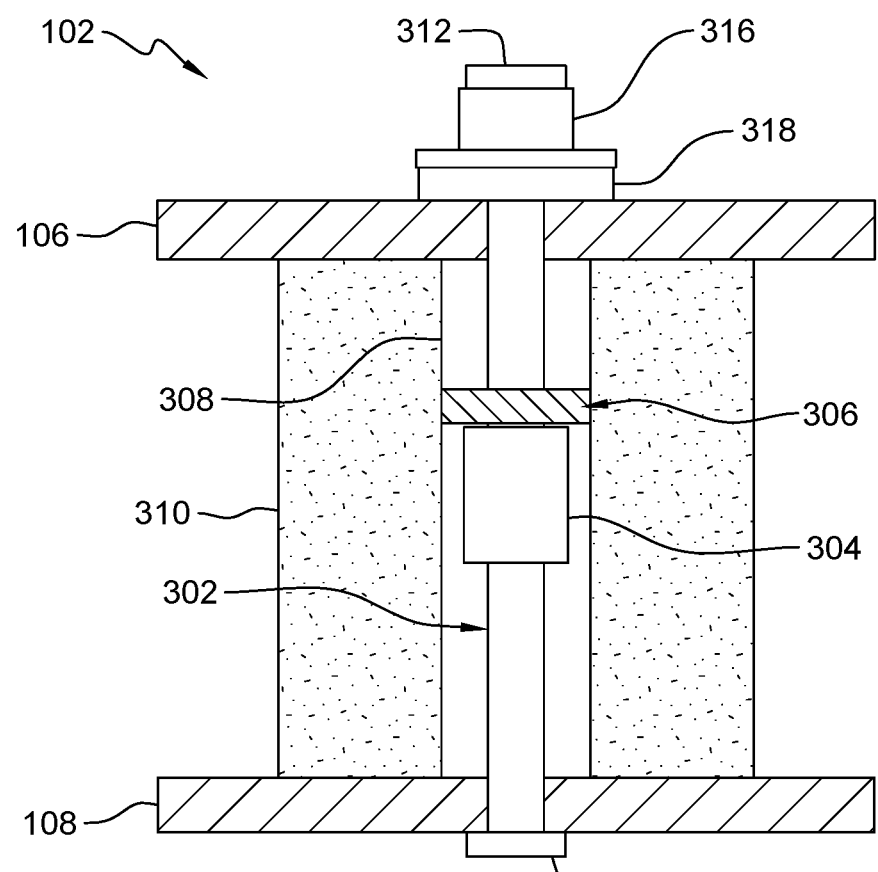
FIG. 3 depicts a faraday generator structure positioned between an upper platform and a lower platform of a pallet, in accordance with an embodiment of the present invention.

FIG. 3 depicts a faraday generator structure positioned between an upper platform and a lower platform of a pallet, in accordance with an embodiment of the present invention. In this embodiment, faraday generator structure 102 includes guide shaft 302 with magnet 304 and coil structure 306 disposed in cavity 308 of dampener 310, where dampener 310 provides structural support between upper platform 106 and lower platform 108. Lower platform 108 remains fixed relative to upper platform 106 when dampener 310 experiences compression and rebound due to a movement of a load on a top surface of upper platform 106, where guide shaft 302 disposed in an aperture of upper platform 106 and lower platform 108 dictates a vertical movement of upper platform 106. In this embodiment, magnet 304 is cylindrical in shape and coupled to guide shaft 302, where a shape and dimensions of magnet 304 are dependent on coil structure 306. Coil structure 306 includes a ring (e.g. metal or composite) with a coil or loop of electrical wire (e.g., copper) surrounding the ring along the circumference, where an area defined by a circumference of an inner portion (i.e., inner aperture area) of the ring allows for magnet 304 to pass through coil structure 306 in the vertical direction (i.e., y-axis). A relative motion between a magnetic field of magnet 304 and coil structure 306 causes the magnetic lines of magnet 304 to pass through an inner aperture area of coil structure 306 inducing a voltage across coil structure 306. Faraday generator structure 102 captures the induced voltage and stores the charge in one or more power storage units (e.g., battery, capacitors, supercapacitors), wherein the one or more power storage units are positioned between upper platform 106 and lower platform 108 and/or one or more power storage units of an electrically coupled to an electronic device for capturing data during transit. In some embodiments, magnet 304 is coupled to guide shaft 302 utilizing a spring, where a compression and rebound of the spring due to movement of the load, upper platform 106, and/or lower platform 108 causes magnet 304 to pass through an inner aperture area of coil structure 306, without requiring compression of dampener 310.

In this embodiment, coil structure 306 is fixed (i.e., coupled) to inner walls within cavity 308 of dampener 310, where a compression of dampener 310 dictates the vertical movement of coil structure 306 relative to magnet 304 on guide shaft 302. Guide shaft 302 includes top end 312 and bottom end 314 to secure faraday generator structure 102 between upper platform 106 and lower platform 108. Cap 316 disposed on piezoelectric pad 318 includes an aperture in which guide shaft 302 is slidable in the vertical direction (i.e., y-axis). Cap 316 secures piezoelectric pad 318 to upper platform 106, where an upward motion of upper platform 106 compresses piezoelectric pad 318. Piezoelectric pad 318 produces piezoelectricity which is an appearance of electrical potential (i.e., voltage) across the sides of crystal (e.g., quartz) of piezoelectric pad 318 when subjected to mechanical stress (i.e. compression). Though the illustrated embodiment includes piezoelectric pad 318 for generating additional power, piezoelectric pad 318 is not necessary and represents an additional source for producing charge in a rebound state of faraday generator structure 102, discussed in further detail with regards to FIG. 4E.

Figure 4A:
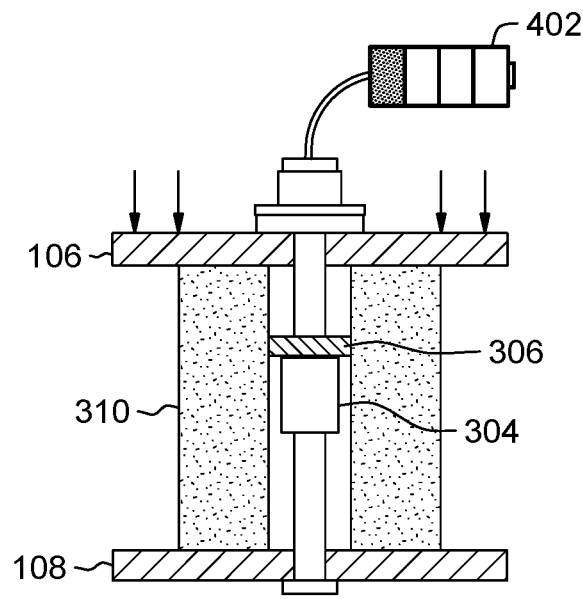
FIG. 4A depicts a faraday generator structure with a load being applied to an upper platform of a pallet in an initial state, in accordance with an embodiment of the present invention.

FIG. 4A depicts a faraday generator structure with a load being applied to an upper platform of a pallet in an initial state, in accordance with an embodiment of the present invention. The initial state represents a load (i.e., shipment) applied to a top surface of upper platform 106, where dampener 310 either partially compresses or does not compress to provide stability to the load. As previously discussed, lower platform 108 remains fixed relative to upper platform 106 and as a result, the partial compression of dampener 310 causes upper platform 106 to move a distance in a downward vertical direction (i.e., −y-axis) equal to a distance of partial compression of dampener 310. Specifications of dampener 310 are customizable based on weight and weight distribution of the load being applied to the top surface of upper platform 106, such that dampener 310 further compresses when an additional force is applied to upper platform 106 due to movement during transit. In one embodiment, a partial compression of dampener 310 when a load is applied to upper platform 106 causes an edge of magnet 304 to at least partially align with an edge of coil structure 306. Therefore, as an additional force is applied to upper platform 106, magnet 304 slides into an inner aperture area of coil structure 306. In another embodiment, a partial compression of dampener 310 when a load is applied to upper platform 106 causes magnet 304 to be at least partial disposed in an inner aperture area of coil structure 306, where any additional force applied to upper platform 106 causes magnet 304 to slide through the inner aperture area of coil structure 306. Voltage indicator 402 illustrates that no voltage is created while in the initial state.

Figure 4B:
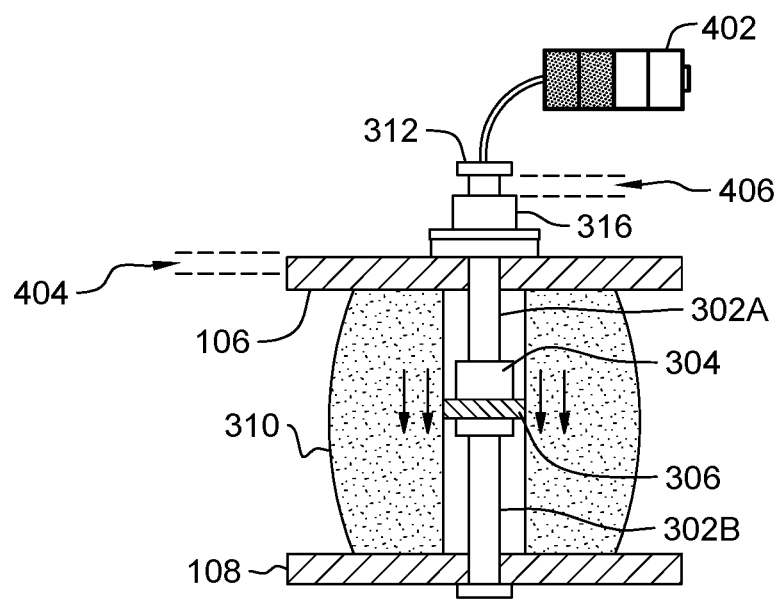
FIG. 4B depicts a faraday generator structure with a damper in a compression transition state, in accordance with an embodiment of the present invention.

FIG. 4B depicts a faraday generator structure with a damper in a compression transition state, in accordance with an embodiment of the present invention. The compression transition state represents a load that is experiencing an additional force being applied to a top surface of upper platform 106 due to movement during transit, where dampener 310 compresses and upper platform 106 moves in a downward direct relative to lower platform 108. As dampener 310 compresses, upper platform 106 travels partial distance 404 in the down direction (i.e., −y-axis), resulting in magnet 304 traveling an equal partial distance through an inner aperture area of coil structure 306. Guide shaft 302 compensates for partial distance 404 by extending top end 312 an equal partial distance 406 from cap 316. Upper platform 106 also has the ability to temporarily deflect a set partial distance due to the additional force being applied to the top surface. In this embodiment, guide shaft 302 is a single structure that includes guide shaft portion 302A and guide shaft portion 302B. In another embodiment, guide shaft 302 is a two-piece structure that include guide shaft portion 302A and guide shaft portion 302B, where magnet 304 is coupled to guide shaft portion 302A and guide shaft portion 302B extends and retracts out of guide shaft portion 302A during compression. An addition spring can be present inside guide shaft portion 302A to provide additional rebound to guide shaft portion 302B. Voltage indicator 402 illustrates that voltage is created while transitioning from the initial state to the compression transition state, where magnet 304 partially passes through an inner aperture area of coil structure 306.

Figure 4C:
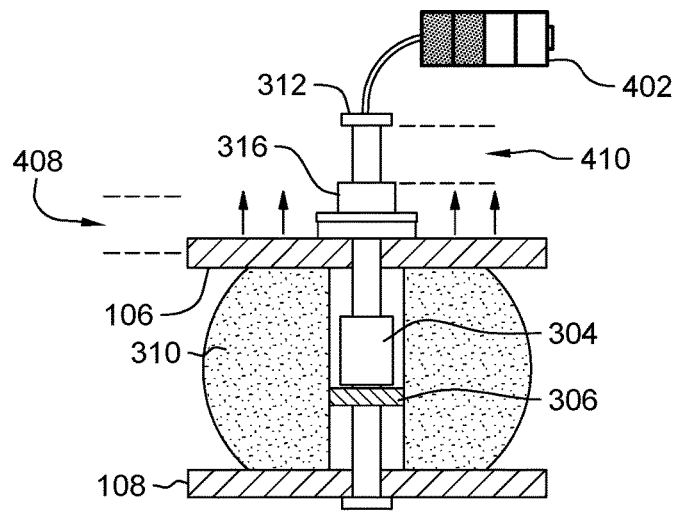
FIG. 4C depicts a faraday generator structure with a damper in a compressed state, in accordance with an embodiment of the present invention.

FIG. 4C depicts a faraday generator structure with a damper in a compressed state, in accordance with an embodiment of the present invention. The compressed state represents a load that is experiencing an additional force being applied to a top surface of upper platform 106 due to movement during transit, where dampener 310 reaches maximum compression due to the additional force. As dampener 310 compresses, upper platform 106 travels compressed distance 408 in the down direction (i.e., −y-axis) relative to lower platform 108, resulting in magnet 304 traveling an equal distance through an inner aperture area of coil structure 306. Guide shaft 302 compensates for compressed distance 408 by extending top end 312 an equal extension distance 410 from cap 316. Voltage indicator 402 illustrates that voltage is further created while transitioning between the transition compression state to the compressed state, where magnet 304 fully passes through an inner aperture area of coil structure 306.

Figure 4D:
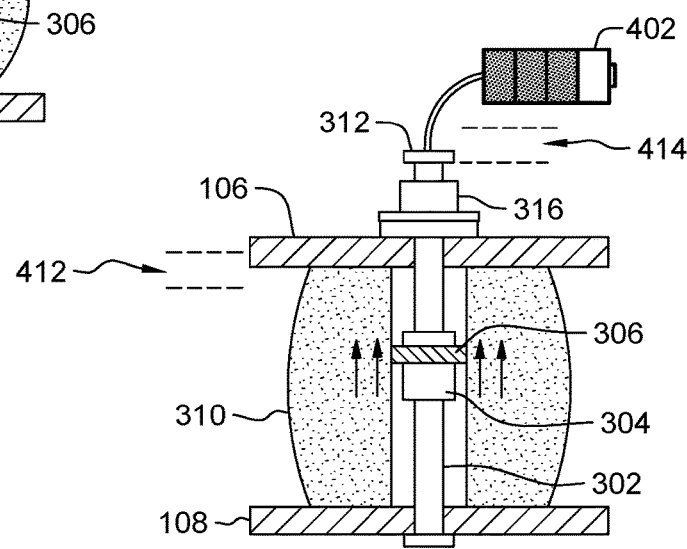
FIG. 4D depicts a faraday generator structure with a damper in a rebound transition state, in accordance with an embodiment of the present invention.

FIG. 4D depicts a faraday generator structure with a damper in a rebound transition state, in accordance with an embodiment of the present invention. The rebound transition state represents a load that is no longer experiencing the effects of the additional force that was applied to a top surface of upper platform 106 due to movement during transit, resulting in dampener 310 transitioning back to the initial state. As dampener 310 rebounds, upper platform 106 travels partial rebound distance 412 in the upward direction (i.e., +y-axis) relative to lower platform 108, resulting in magnet 304 traveling an equal partial rebound distance through an inner aperture area of coil structure 306. Guide shaft 302 compensates for partial rebound distance 412 by retracting top end 312 an equal partial retraction distance 412 from cap 316. Voltage indicator 402 illustrates that voltage is further created while transitioning between the compressed state to the rebound transition state, where magnet 304 partially passes through an inner aperture area of coil structure 306.

Figure 4E:
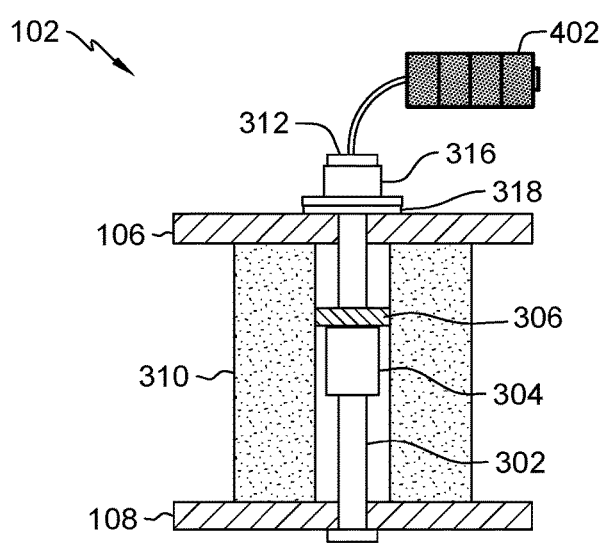
FIG. 4E depicts a faraday generator structure with a damper in a rebound state, in accordance with an embodiment of the present invention.

FIG. 4E depicts a faraday generator structure with a damper in a rebound state, in accordance with an embodiment of the present invention. The rebound state represents a load that is no longer experiencing the effects of the additional force that was applied to a top surface of upper platform 106 due to movement during transit, where dampener 310 has fully rebounded to the initial state. In this embodiment, faraday generator structure 102 utilizes piezoelectric pad 318 which exploits the upward directional movement (i.e., +y-axis) of upper platform 106 relative to lower platform 108 during the rebound movement of dampener 310. As upper platform 106 moves in the upward direction, piezoelectric pad 318 is compressed between a top surface of upper platform 106 and cap 316, where top end 312 of guide shaft 302 limits movement of cap 316. As previously mentioned above, piezoelectric pad 318 is not necessary and represents an additional source for producing charge in a rebound state of faraday generator structure 102. Voltage indicator 402 illustrates that voltage is further created while completing the transition to the rebound state by compressing piezoelectric pad 318, where magnet 304 fully passes through an inner aperture area of coil structure 306.

Figure 5:
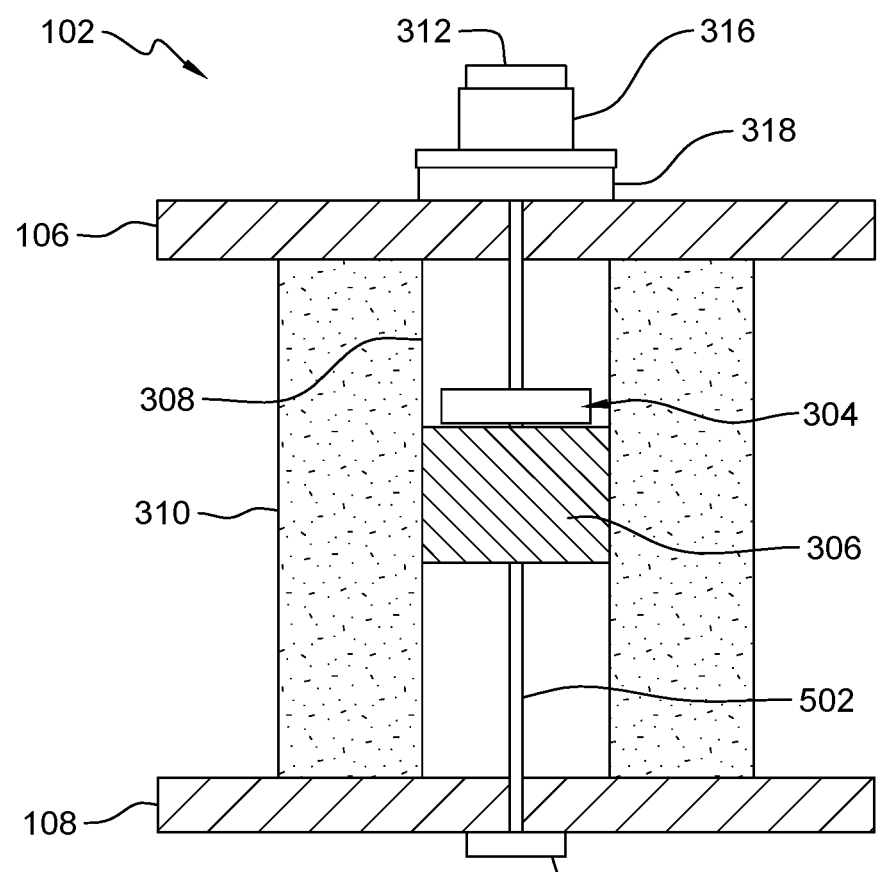
FIG. 5 depicts a faraday generator structure utilizing a guide wire positioned between an upper platform and a lower platform of a pallet, in accordance with an embodiment of the present invention.

FIG. 5 depicts a faraday generator structure utilizing a guide wire positioned between an upper platform and a lower platform of a pallet, in accordance with an embodiment of the present invention. In this embodiment, faraday generator structure 102 includes guide wire 502 with magnet 304 and coil structure 306 disposed in cavity 308 of dampener 310, where dampener 310 provides structural support between upper platform 106 and lower platform 108. In this embodiment, coil structure 306 is fixed within cavity 308 of dampener 310, where a compression of dampener 310 dictates the vertical movement of coil structure 306 relative to magnet 304 on guide wire 502. Guide wire 502 is flexible, such that magnet 304 can pass through an inner aperture area of coil structure 306 when dampener 310 compresses and rebounds due to an additional force being applied to upper platform 108. In other embodiments, guide wire 502 is a spring that compresses along with dampener 310 when an additional force is being applied to upper platform 108, where a compression of the spring (i.e., guide wire 502) results in magnet 304 passing through an inner aperture area of coil structure 306. Guide wire 502 includes top end 312 and bottom end 314 to secure faraday generator structure 102 between upper platform 106 and lower platform 108. Cap 316 disposed on piezoelectric pad 318 each an aperture in which guide shaft 302 is slidable in the vertical direction (i.e., y-axis). Cap 316 secures piezoelectric pad 318 to upper platform 106, where an upward motion of upper platform 106 compresses piezoelectric pad 318. Piezoelectric pad 318 produces piezoelectricity which is an appearance of electrical potential (i.e., voltage) across the sides of crystal (e.g., quartz) of piezoelectric pad 318 when subjected to mechanical stress (i.e. compression). As previously mentioned, though the illustrated embodiment includes piezoelectric pad 318 for generating additional power, piezoelectric pad 318 is not necessary and represents an additional source for producing charge in a rebound state of faraday generator structure 102, discussed in further detail with regards to FIG. 6E.

Figure 6A:
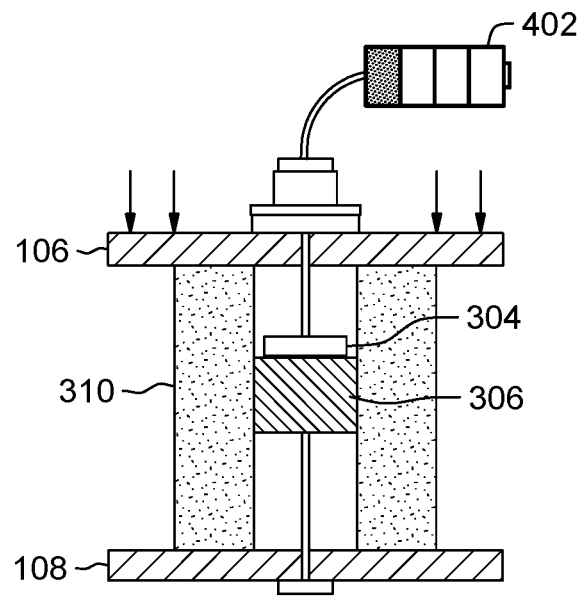
FIG. 6A depicts a faraday generator structure utilizing a guide wire with a load being applied to an upper platform of a pallet in an initial state, in accordance with an embodiment of the present invention.

FIG. 6A depicts a faraday generator structure utilizing a guide wire with a load being applied to an upper platform of a pallet in an initial state, in accordance with an embodiment of the present invention. The initial state represents a load (i.e., shipment) applied to a top surface of upper platform 106, where dampener 310 either partially compresses or does not compress to provide stability to the load. As previously discussed, lower platform 108 remains fixed relative to upper platform 106 and as a result, the partial compression of dampener 310 causes upper platform 106 to move a distance in a downward vertical direction (i.e., −y-axis) equal to a distance of partial compression of dampener 310. Specifications of dampener 310 are customizable based on weight and weight distribution of the load being applied to the top surface of upper platform 106, such that dampener 310 further compresses when an additional force is applied to upper platform 106 due to movement during transit. In one embodiment, a partial compression of dampener 310 when a load is applied to upper platform 106 causes an edge of magnet 304 to at least partially align with an edge of coil structure 306. Therefore, as an additional force is applied to upper platform 106, magnet 304 slides into an inner aperture area of coil structure 306. In another embodiment, a partial compression of dampener 310 when a load is applied to upper platform 106 causes magnet 304 to be at least partial disposed in an inner aperture area of coil structure 306, where any additional force applied to upper platform 106 causes magnet 304 to slide through the inner aperture area of coil structure 306. Voltage indicator 402 illustrates that no voltage is created while in the initial state.

Figure 6B:
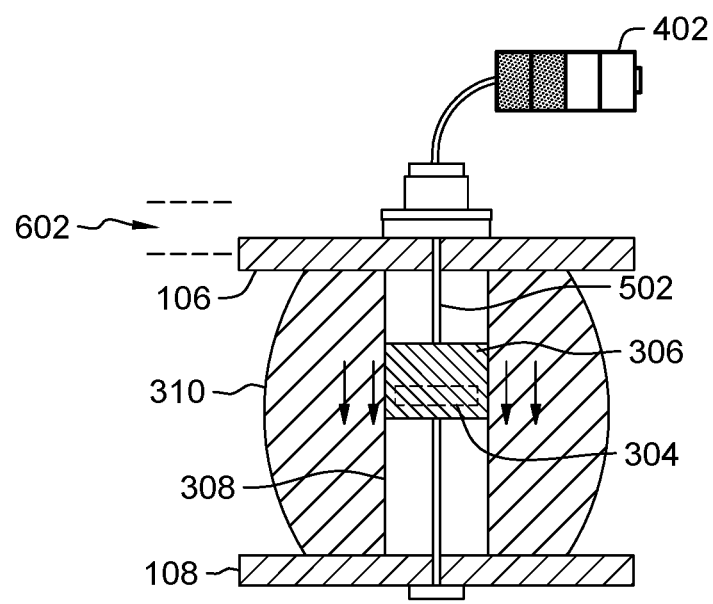
FIG. 6B depicts a faraday generator structure utilizing a guide wire with a damper in a compression transition state, in accordance with an embodiment of the present invention.

FIG. 6B depicts a faraday generator structure utilizing a guide wire with a damper in a compression transition state, in accordance with an embodiment of the present invention. The compression transition state represents a load that is experiencing an additional force being applied to a top surface of upper platform 106 due to movement during transit, where dampener 310 compresses and upper platform 106 moves in a downward direct relative to lower platform 108. As dampener 310 compresses, upper platform 106 travels partial distance 602 in the down direction (i.e., −y-axis), resulting in magnet 304 traveling an equal partial distance through an inner aperture area of coil structure 306. Guide wire 502 compensates for partial distance 602 by compressing within cavity 308 of dampener 310. Upper platform 106 also has the ability to temporarily deflect a set partial distance due to the additional force being applied to the top surface. Voltage indicator 402 illustrates that voltage is created while transitioning from the initial state to the compression transition state, where magnet 304 partially passes through an inner aperture area of coil structure 306.

Figure 6C:
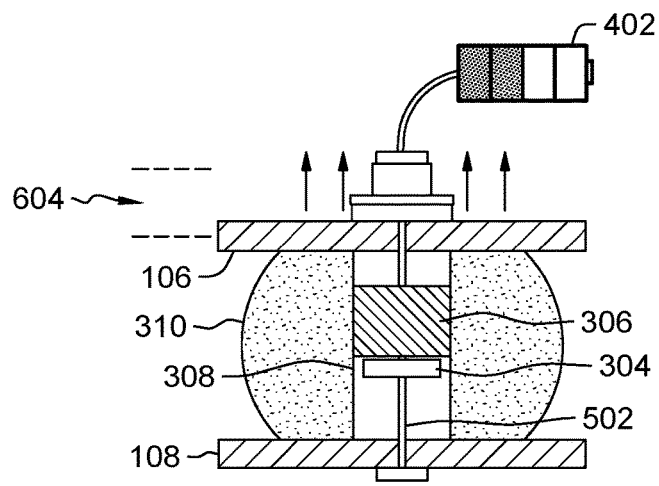
FIG. 6C depicts a faraday generator structure utilizing a guide wire with a damper in a compressed state, in accordance with an embodiment of the present invention.

FIG. 6C depicts a faraday generator structure utilizing a guide wire with a damper in a compressed state, in accordance with an embodiment of the present invention. The compressed state represents a load that is experiencing an additional force being applied to a top surface of upper platform 106 due to movement during transit, where dampener 310 reaches maximum compression due to the additional force. As dampener 310 compresses, upper platform 106 travels compressed distance 604 in the down direction (i.e., −y-axis) relative to lower platform 108, resulting in magnet 304 traveling an equal distance through an inner aperture area of coil structure 306. Guide wire 502 further compensates for compressed distance 604 by compressing within cavity 308 of dampener 310. Voltage indicator 402 illustrates that voltage is further created while transitioning between the transition compression state to the compressed state, where magnet 304 fully passes through an inner aperture area of coil structure 306.

Figure 6D:
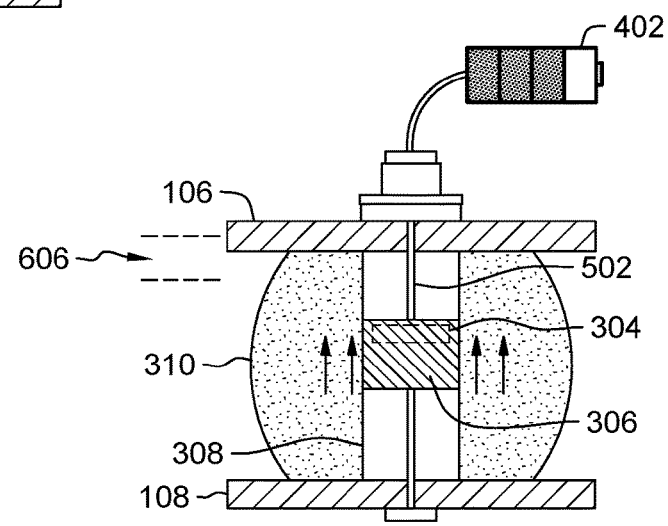
FIG. 6D depicts a faraday generator structure utilizing a guide wire with a damper in a rebound transition state, in accordance with an embodiment of the present invention.

FIG. 6D depicts a faraday generator structure utilizing a guide wire with a damper in a rebound transition state, in accordance with an embodiment of the present invention. The rebound transition state represents a load that is no longer experiencing the effects of the additional force that was applied to a top surface of upper platform 106 due to movement during transit, resulting in dampener 310 transitioning back to the initial state. As dampener 310 rebounds, upper platform 106 travels partial rebound distance 606 in the upward direction (i.e., +y-axis) relative to lower platform 108, resulting in magnet 304 traveling an equal partial rebound distance through an inner aperture area of coil structure 306. Guide wire 502 compensates for partial rebound distance 606 by expanding within cavity 308 of dampener 310. Voltage indicator 402 illustrates that voltage is further created while transitioning between the compressed state to the rebound transition state, where magnet 304 partially passes through an inner aperture area of coil structure 306.

Figure 6E:
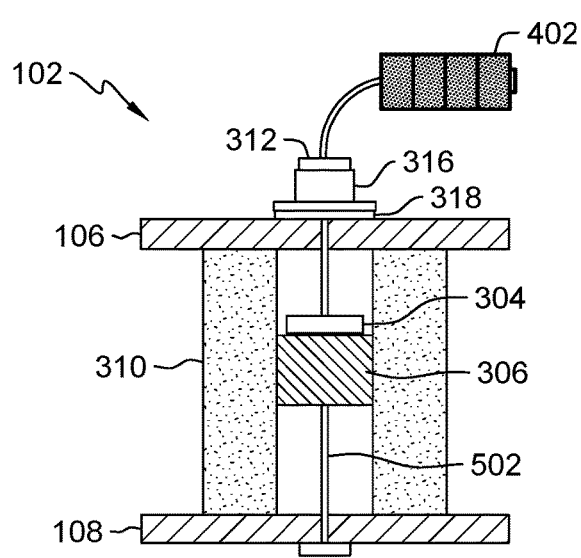
FIG. 6E depicts a faraday generator structure utilizing a guide wire with a damper in a rebound state, in accordance with an embodiment of the present invention.

FIG. 6E depicts a faraday generator structure utilizing a guide wire with a damper in a rebound state, in accordance with an embodiment of the present invention. The rebound state represents a load that is no longer experiencing the effects of the additional force that was applied to a top surface of upper platform 108 due to movement during transit, where dampener 310 has fully rebounded to the initial state. In this embodiment, faraday generator structure 102 utilizes a piezoelectric pad 318 which exploits the upward directional movement (i.e., +y-axis) of upper platform 106 relative to lower platform 108 during the rebound movement of dampener 310. As upper platform 106 moves in the upward direction, piezoelectric pad 318 is compressed between a top surface of upper platform 106 and cap 316, where top end 312 of guide wire 502 limits movement of cap 316. As previously mentioned above, piezoelectric pad 318 is not necessary and represents an additional source for producing charge in a rebound state of faraday generator structure 102. Voltage indicator 402 illustrates that voltage is further created while completing the transition to the compressed state and compressing piezoelectric pad 318, where magnet 304 fully passes through an inner aperture area of coil structure 306.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

What is claimed is:

1. An apparatus for a faraday generator structure, the apparatus comprising:
   the faraday generator structure disposed between an upper platform and a lower platform, wherein the faraday generator structure includes a magnet, a coil structure, and a guide shaft;
   the magnet coupled to the guide shaft configured to pass through an inner aperture area of the coil structure during a compression and rebound of a dampener positioned between the upper platform and the lower platform, wherein a voltage is produced as the magnet passes through the inner aperture area of the coil structure;
   the dampener configured to compress under an additional load applied to an existing load on a top surface of the upper platform, wherein the upper platform, the lower platform, and the dampener form a pallet; and
   the faraday generator structure configured to provide the voltage to an electrically coupled power storage unit.

2. The apparatus of claim 1, further comprising:
   the coil structure disposed in a cavity of the dampener, wherein the coil structure is coupled to one or more inner walls of the cavity of the dampener.

3. The apparatus of claim 1, wherein the upper platform is configured to move in a vertical direction relative to the lower platform as dictated by the compression and the rebound of the dampener.

4. The apparatus of claim 1, further comprising:
   the dampener disposed on a top surface of the lower platform; and
   the upper platform disposed on a top surface of the dampener, wherein the guide shaft is disposed in an aperture of the upper platform and an aperture of the lower platform.

5. The apparatus of claim 4, further comprising:
   a bottom end of the guide shaft secures the faraday generator structure to the lower platform; and
   a top end of the guide shaft secures the faraday generator structure to the upper platform.

6. The apparatus of claim 5, further comprising:
   a piezoelectric pad disposed on the top surface of the upper platform;
   a cap structure configured to secure the piezoelectric pad to the top surface of the upper platform; and
   the top end of the guide shaft configured to secure the cap structure, wherein the guide shaft is disposed in an aperture of the piezoelectric pad and an aperture of the cap structure.

7. The apparatus of claim 6, wherein the piezoelectric pad is configured to compress between the cap structure and the top surface of the upper platform during the rebound of the dampener.

8. The apparatus of claim 7, wherein the piezoelectric pad is further configured to compress between the cap structure and the top surface of the upper platform during a deflection of the upper platform.

9. The apparatus of claim 1, wherein the power storage unit is disposed between the upper platform and the lower platform.

10. The apparatus of claim 1, wherein the power storage unit is associated with an electronic device, wherein the electronic device is electrically coupled to the faraday generator structure.

11. The apparatus of claim 10, wherein the electronic device includes one or more sensors for capture readings selected from a group consisting of: position, shock, vibration, tilt, temperature, humidity, and light.

12. The apparatus of claim 11, wherein the electronic device is disposed between the upper platform and the lower platform.

13. The apparatus of claim 11, wherein the electronic device is affixed to the existing load disposed on the top surface of the upper platform.

14. The apparatus of claim 1, further comprising:
a first portion of the guide shaft disposed in a second portion of the guide shaft, wherein the first portion of the guide shaft is configured to extend and retract out of the second portion of the guide shaft based on the compression and the rebound of the dampener.

15. The apparatus of claim 14, further comprising:
a spring disposed inside the second portion of the guide shaft configured to provide additional rebound to the first portion of the guide shaft.

16. The apparatus of claim 1, wherein the upper platform is configured to move in a vertical direction relative to the lower platform as dictated by the compression and the rebound of the dampener.

17. The apparatus of claim 1, further comprising:
the dampener disposed on a top surface of the lower platform; and
the upper platform disposed on a top surface of the dampener, wherein the guide shaft is disposed in an aperture of the upper platform and an aperture of the lower platform.

* * * * *